United States Patent [19]

Smith, III

[11] Patent Number: 5,466,158
[45] Date of Patent: Nov. 14, 1995

[54] INTERACTIVE BOOK DEVICE

[76] Inventor: Jay Smith, III, 348 Bentel Ave., Los Angeles, Calif. 90049

[21] Appl. No.: 196,023

[22] Filed: Feb. 14, 1994

[51] Int. Cl.$^6$ ........................................ G09B 5/00
[52] U.S. Cl. .................. 434/317; 434/308; 434/362; 273/236; 462/55
[58] Field of Search ....................... 434/156, 157, 434/159, 169, 178, 185, 201, 259, 307 R, 308, 317, 322, 323, 327, 334, 337, 339, 350, 362, 365; 341/34; 200/5 A; 462/17, 55; 40/409, 411, 427; 178/18, 19; 345/168, 173, 901; 273/236–239, 272

[56] References Cited

U.S. PATENT DOCUMENTS

| | | | |
|---|---|---|---|
| 3,220,126 | 11/1965 | Gabrielsen | 434/317 X |
| 3,520,074 | 7/1970 | Severin et al. | 434/339 X |
| 3,696,524 | 10/1972 | Kranyik et al. | 434/308 |
| 3,771,240 | 11/1973 | Matui | 434/339 |
| 3,800,437 | 4/1974 | Lamberson | 434/339 |
| 4,439,757 | 3/1984 | Gross et al. | 434/176 X |
| 4,521,199 | 6/1985 | Harte | 434/339 |
| 4,681,548 | 7/1987 | Lemelson | 434/311 |
| 4,729,564 | 3/1988 | Kuna et al. | |
| 4,824,376 | 4/1989 | Arash | 434/327 X |
| 4,839,634 | 6/1989 | More et al. | |
| 4,855,725 | 8/1989 | Fernandez | 434/308 X |
| 4,862,497 | 8/1989 | Seto et al. | |
| 4,879,557 | 11/1989 | Roche | |
| 4,884,974 | 12/1989 | DeSmet | 434/317 |
| 4,890,096 | 12/1989 | Taguchi et al. | |
| 5,067,079 | 11/1991 | Smith, III et al. | |
| 5,088,928 | 2/1992 | Chan | 434/339 |
| 5,226,822 | 7/1993 | Morris | 434/359 |
| 5,356,296 | 10/1994 | Pierce et al. | 434/327 X |

FOREIGN PATENT DOCUMENTS

| | | | |
|---|---|---|---|
| 0048835 | 4/1982 | European Pat. Off. | 434/339 |
| 1454349 | 11/1976 | United Kingdom | 434/339 |

*Primary Examiner*—Joe H. Cheng
*Attorney, Agent, or Firm*—Price Gess & Ubell

[57] ABSTRACT

A device to allow reader interaction with printed materials such as comic books is provided. The device comprises a base unit with a sensitive upper surface on which is placed the printed material. The reader answers questions and solves challenges posed in the printed material by exerting pressure on specially marked areas of the printed page. The sensitive surface translates the pressure into electrical signals which signify the location of the pressure, and the device makes appropriate audio or other responses. The reader is led through the printed material as the specially marked areas become active sequentially. A printed story is thereby transformed into an interactive experience with various game challenges and sound effects. The sound effects and logical challenges for each story are stored in a readily replaceable cartridge. Any number of different printed materials can be used as long as the specific cartridge for each different printed material is inserted into the base unit.

29 Claims, 7 Drawing Sheets

MAIN LOOP

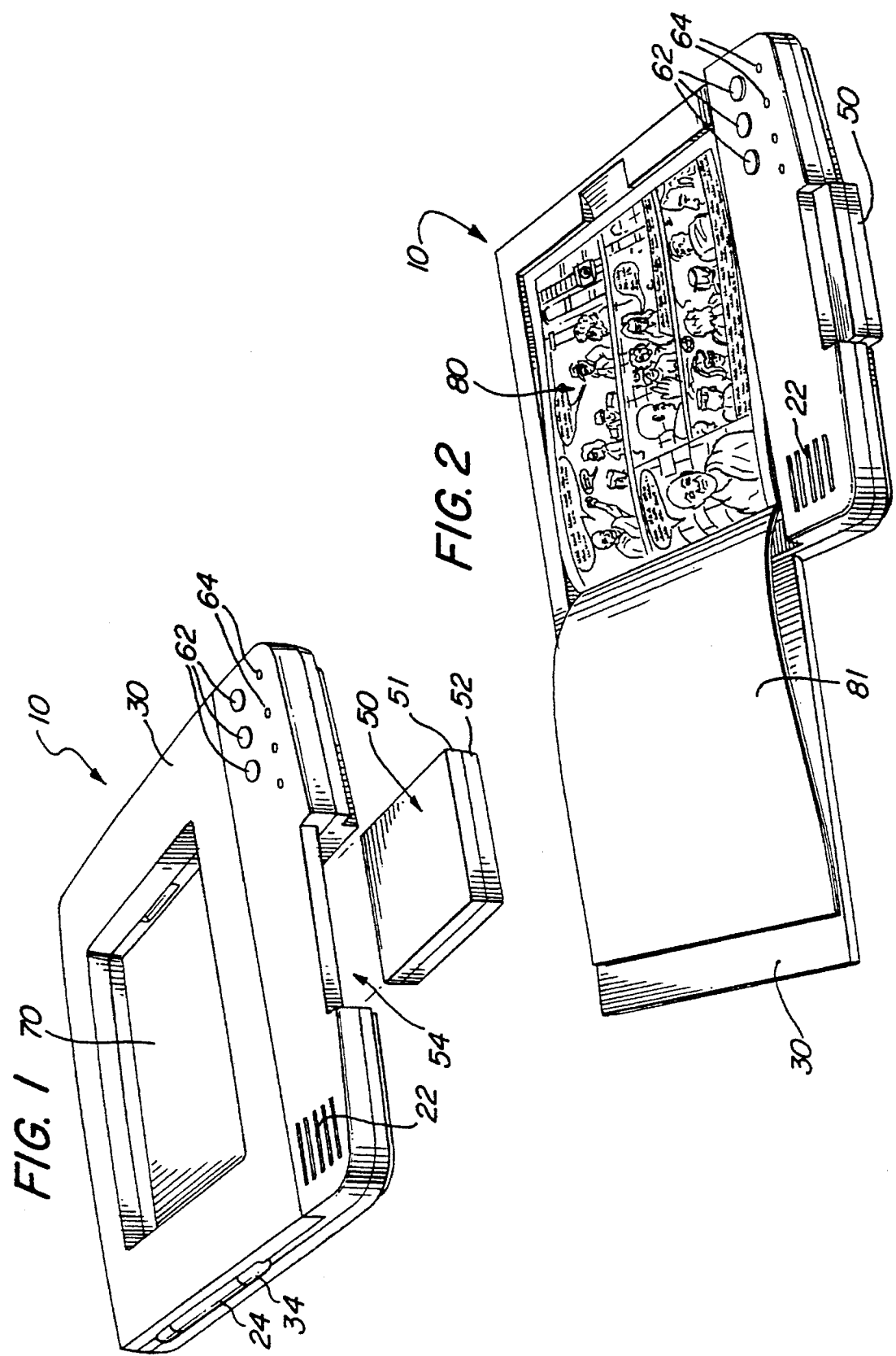

INTERACTIVE BOOK DEVICE

BACKGROUND OF THE INVENTION

1. Field of the Invention

The present invention relates generally to the area of electronic entertainment and educational devices and, more specifically, to a device that allows a reader to interact with and play games with a printed book.

2. Description of Related Art

Video games are extremely popular at the present time and represent a growing segment of the entertainment industry. Video games have evolved greatly since their humble beginnings some 30 years ago. Early games were electronic representations of games such as table tennis. The graphics were limited to a crude black-and-white representation of a paddle (white line) and a ball (white spot). The players could manipulate the vertical positions of the paddles and thus send the ball back and forth across a video screen. The game action was accompanied by crude sound effects that represented a ball striking a paddle. Today's games bear little resemblance to the early games. The graphics are in full color and show highly detailed, fully animated figures. The games are accompanied by music and a variety of realistic, synchronized sound effects. Moreover, the games are extremely complex and demand considerable physical coordination and strategy on the part of the players.

The video games exist as "pay per play" arcade games, as well home versions for attaching to television sets. The major problem with game units such as these that are based around a color CRT is that they tend to be large and nonportable. Not only is the screen itself large and heavy, the complex electronics, in spite of modern miniaturization, are relatively bulky and also consume considerable power, thereby precluding battery operation. All of the current video games are based around microprocessors which generate the graphics and sounds and implement the logical manipulations necessary for an effective game. The microprocessors are equipped with volatile memory (RAM) and permanent storage (often ROM) in which the game instructions (program) are stored. In fact, the modern video game has more in common with a personal computer than with any other electronic device. The video game is actually a personal computer optimized to execute special game programs.

Therefore, the physical and economic factors that affect video games are similar to those that control personal computers. The more powerful the microprocessor, the more rapid and complex the output. That is, faster microprocessors are able to produce high-speed games with vivid, detailed graphics. However, more powerful processors are usually more expensive and require a larger amount of more expensive memory. Arcade games, within limits, can be more expensive as long as their superior quality results in sufficient player popularity to amortize the increased cost. However, many home video games are sold for use by children and adolescents. Parents usually balk at paying personal computer prices (at least $800.00) for a "toy." Therefore, while top end notebook personal computers are capable of producing high quality, full color graphics in a portable package, portable video games do not have such ability. This is not surprising when one considers that full color notebook computers currently retail for several thousand dollars apiece.

Up to now economic considerations have dictated that portable video games are limited to comparatively simple games with simple graphics on a small, black-and-white LCD (liquid crystal display). Microprocessors that are capable of more sophisticated graphics are too expensive and too power hungry for a small, hand-held game.

On the other hand, printed materials, such as comic books, have long been a low-tech source of highly detailed and sophisticated graphics. Comic books are an extremely popular source of entertainment. However, a printed book is a static thing; once a given comic has been read, much of its attractiveness is exhausted. While a book can provide a story and stimulate the imagination, there is little opportunity for the reader to interact with the story. There have been several attempts to "liven up" printed materials.

Books have been produced with accompanying records or tapes that provide music and sound effects and perhaps narration. The reader is generally instructed to turn the page when a particular sound, such as the ringing of a bell is heard. This system has never been very satisfactory. If the reader pauses to carefully inspect or read the page, the recording will keep going and synchronization of sound with the printed page is quickly lost. Although tape cassettes can be easily stopped, a reader can still miss the "bell" and have a great deal of difficulty rewinding the tape to find the correct position. Because one goal of such tape/book combinations is to encourage reading, frustration caused by lack of synchronization is particularly counterproductive. Also, recorded books, like printed books, lose much of their appeal after one performance and have trouble competing with the interactive qualities of even simple video games.

There have also been limited attempts to adapt modern electronics to printed books. In particular, micro-electronics have been used to provide sound effects for simple picture books. Generally, a book is combined with a device containing a plurality of marked buttons or switches. The buttons are marked with pictures of animals (or other sound-making objects) that occur in the story. The text of the story is also marked with these animal "icons" at key points in the story. When the reader come to one of the animal "icons," the reader presses the similarly marked button and is rewarded by an appropriate, electronically-synthesized sound. Such a system has the advantage of avoiding any synchronization problems. However, the sounds do not really add much to the lifetime of the story-it still becomes boring after a few readings. Generally, the device degenerates into a noise maker as the reader soon learns to repeatedly press the buttons at inappropriate times. Furthermore, there is little flexibility since a given sound-making device can be used with only a single or, at the most, a small number of story books.

OBJECTS AND SUMMARY OF THE INVENTION

It is an object of the present invention to provide a compact and portable source of interactive entertainment;

It is a further object of the present invention to provide a portable device that combines stimulating graphic images with various appropriate sound effects;

It is an additional object of the present invention to provide a device that combines a printed book and electronics with no problems of synchronization between the book and the electronics;

It is another object of the present invention to provide a flexible device that can be used with an essentially infinite number of properly designed printed books; and It is an object of the present invention to provide a device that combines the interactive challenges of a video game with the text and graphics of a printed book.

These and other objects are accomplished by a base unit on which is mounted a printed book. Generally, the book will be an illustrated work of the type generally called "comic books." However, other picture or even mostly text books can readily be adapted to work with the present invention. The base unit provides a touch sensitive surface over which the book is mounted. The sensitive surface is capable of detecting which areas of the printed page are touched by the reader. Of course, the sensitive surface can also be designed to respond to other stimulae. The switches could be Hall effect sensors and the reader could activate such a switch by touching it with a magnet rather than by pressing on it. Alternatively, the switches could comprise sensors that detect the heat of the reader's finger or the blocking of ambient light by the reader's finger. The system has the ability to resolve at least 25 separate points distributed over a page of about 6.4 inches by about 7.6 inches.

The base unit also provides a plurality of switches that the reader can directly operate. These switches are used in a manner similar to the input switches or buttons on a traditional video game. The base unit also provides a speaker so that the unit may output appropriate sound effects and spoken words. A number of light emitting diodes (LEDs) are provided so the unit can visibly communicate with the reader. Finally, the base unit contains a slot into which the reader inserts a "game cartridge." The cartridge is specific to one or a few comic books. Each new book or set of books is purchased along with an appropriate cartridge. The cartridge contains a specialized microprocessor along with a logical program and recorded sound effects that are tied to a particular book.

The reader is instructed to touch various printed objects (targets) as he/she reads the book. Each page has a different arrangement of objects that are to be touched. The microprocessor is programmed to accept only one target at a given time. Only after the first target on a page is touched does the second target become active. After the second object is touched, the third object becomes active, and so on. Because the positional pattern of targets for each page is unique, the microprocessor is automatically synchronized to the page and the actions of the reader. Because the objects become active sequentially, the reader is forced to move forward through the book.

The combination of the base unit and the printed book provides a completely interactive experience that is controlled and paced by the reader. For example, pressing a target might provide a realistic sound effect that is appropriate to that point in the story. Pressing a given target might also yield spoken instructions to the reader/ player. Although the device is intended for stand alone use, there is no reason why the unit cannot also interact with more traditional video games. That is, the unit could be connected to a video game by means of a cable or by modulated infrared light beam as is well known in the art. The traditional video game could provide more elaborate outputs keyed to the reader's interaction with the book.

The story can be constructed with many possible outcomes. The player then determines the outcome by answering questions posed by the printed story or by audio messages from the base unit. The player's choices can be transmitted to the unit by pressing of a specific target key or by pressing either a single or a special sequence of buttons on the base unit. In this way, the microprocessor can challenge the player with complex memory, logic and coordination games that fit in with a given story. The player can earn a score that is computed by his or her skill at these games. Furthermore, the microprocessor can randomly compute factors that make the game challenges and certain aspects of the story come out differently each time the player "reads" the book. Thus, the present invention keeps the comic book/game from becoming stale after a single interaction.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 shows a perspective view of the complete device with the bezel closed and the book in place;

FIG. 2 shows a perspective view of the complete device with the bezel open and the book in place;

DETAILED DESCRIPTION OF THE PREFERRED EMBODIMENTS

Figure 3:
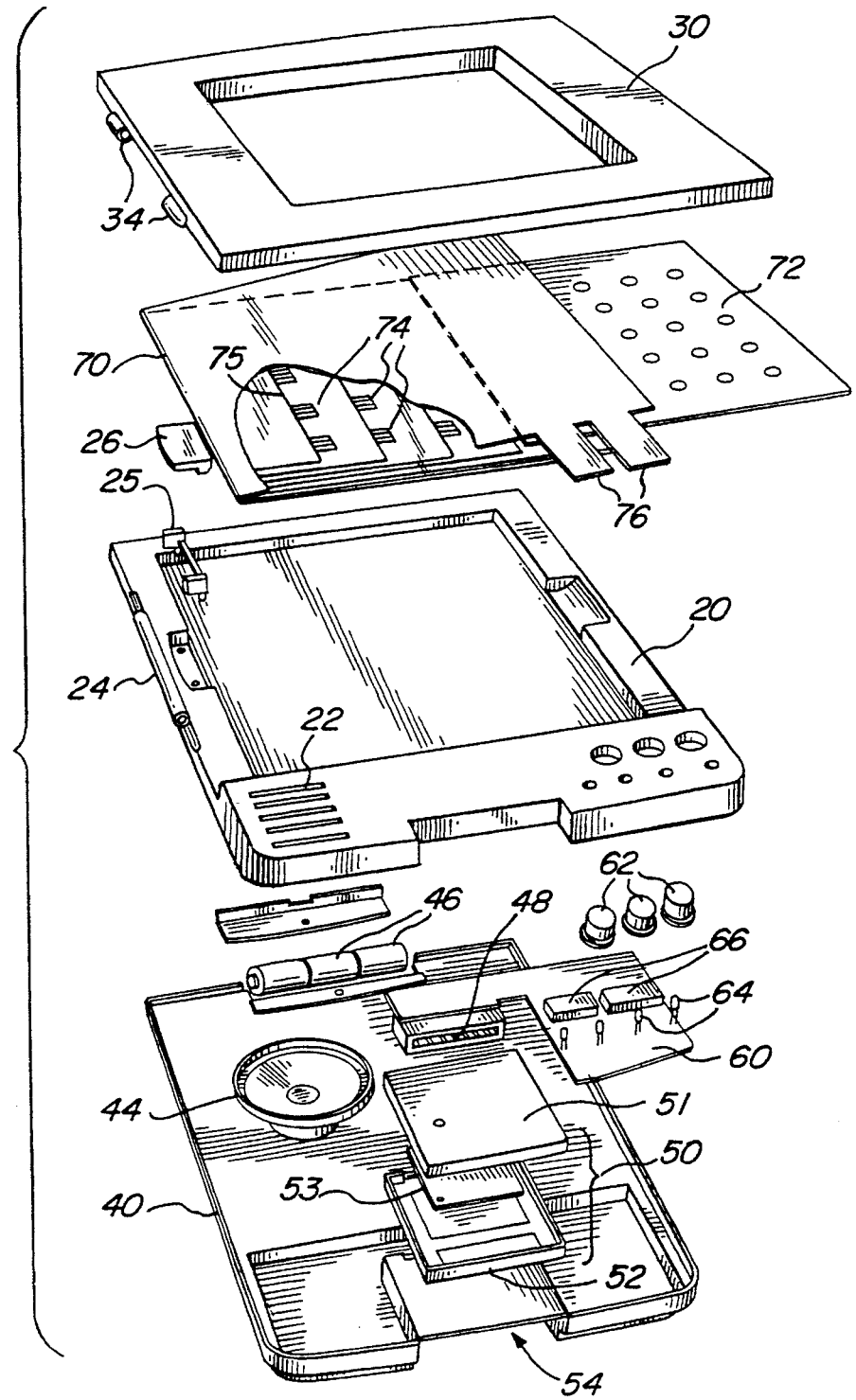
FIG. 3 is an exploded perspective view showing the internal components of the base unit.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an interactive book system.

The complete system comprises a base unit 10, a specially prepared printed book such as a comic book 80, and a special game cartridge 50 that matches the book. FIG. 1 show the complete system. The base unit 10 is essentially a rectangular box about seven by eight inches and about one and one-half-inch thick. The comic book 20 is detachably mounted to the top surface and for shipping and storage is covered by a decorative bezel 30. Besides holding the comic in position during shipping, this arrangement allows in package demonstration. The packaging material can display text that invites the prospective customers to press a target spot on the comic book 80 cover. Because the cellophane wrapping that protects the unit on the shelf is pliable, pressing the indicated spot activates the base unit 10 and gives the prospective purchaser a sample of the unit's sound effects.

Various user interaction switches 62, a master on/off switch (not shown), and light-emitting diodes 64 are disposed about the top surface edges of the base unit that are not covered by the bezel. There is also a series of slots 22 to allow the escape of sounds from a speaker 44 mounted within the base unit 10. There is an earphone jack (not shown) that disables the speaker so that the interaction can be experienced without disturbing anyone. A game cartridge 50 is accommodated by a slot 54 in a side of the base unit 10.

When the unit is actually used by a reader, the bezel 30 is swung open on hinges 24, 34 as shown in FIG. 2. This allows the reader to turn the pages of the book and to detach the book from a clamp 25, 26 and replace it with a different book. As shown in FIG. 3, the base unit 10 is molded out of plastic and is quite simple internally. A top half 20 is attached to a bottom half 40, thereby enclosing some components. An L-shaped printed circuit board (PCB) 60 is mounted on the plastic bottom half 40 of the base unit 10. A 2¼ inch speaker 44 is also mounted on the bottom half 40 and is positioned below the slots 22. Mounted on the PCB 60 are a number of LEDs 64 and a number of user switches 62. A small number of miscellaneous electronic components that are necessary for the correct functioning of the switches and LEDs may also be mounted on the PCB 60. There are a number of connectors: two keypad connectors 66 for the membrane switches 70 (described below); a power connector (not shown) to the on-board batteries 46; and a cartridge connector 48 for the game cartridge 50.

As also shown in FIG. 3, the game cartridge 50 comprises a top half 51 and a bottom half 52 enclosing a small PCB 53. The main component on the PCB 53 is a microprocessor chip (not shown), along with a few electronic components necessary for the proper functioning and interface of the microprocessor. A number of different microprocessors and associated sound generating circuitry could be used in the device. A viable unit can be produced less expensively by placing the microprocessor and ROM in the base unit 10 and deleting the game cartridge 50. However, this limits the system unit to a small number of comic books. It is also possible to place the microprocessor in the base unit 10 and have the game cartridge 50 contain only a read only memory (ROM) which stores the program for the microprocessor.

The most economical and efficient choice appears to be to place a dedicated microprocessor containing a built-in program and sound generating capabilities in the game cartridge 50. The preferred embodiment uses a Texas Instrument 50 C19 speech processor/microprocessor, an eight-bit microprocessor with special built-in sound-generating circuitry. The chip contains a 32,000 byte mask ROM for program and sound storage. This allows about 175 spoken words and 25 special sound effects for each cartridge: sufficient capacity for several comic books.

The top surface of the base unit is largely occupied by an approximately five-inch by six-inch array of membrane switches 70 as shown in FIG. 3. There are about 25 pressure sensitive switches 74 of the type normally used in electronic keypads. The switch array 70 is connected by ribbon plugs 76 to connectors 66 of PCB 60. Each switch 74 is formed from two conductive regions separated by an insulating spacer 72. Pressure on the switch 74 causes electrical contact through the spacer. Although in theory a very large number of positions could be detected per page, in actual use misregistration of the overlying book, as well as expansion of envelope of transmitted force by the thickness of the book (that is, the area of pressure represented by the reader's fingertip is enlarged by the thickness of the pages between that finger and the switch array 70) somewhat degrades the resolution. The Applicant has determined that a resolution of about 20–25 target positions per page is readily obtainable and yields reproducible results. The significant point is that the switch array 70 is capable of accurately detecting pressure from the reader's finger through at least eight printed pages.

The basic functioning of this arrangement is readily grasped. The comic book 80 that is placed over the switch array 70 has text that invites the reader to press one or more targets. The targets are clearly indicated in the graphics. The page is designed so that the targets overlay particular membrane switches 74. When the reader presses a target and activates the corresponding switch 74, the activation is detected by the microprocessor which then processes the activation according to the on-board program. As will be explained more fully below, the unit is programmed so that only one switch (target) or, in some cases, a small group of switches is active at any one time. All the other switches are inactive; pressing inactive switches will have no effect. The various targets become sequentially active, thereby forcing the reader to move forward through the book.

The major exception to this sequential rule is the "reset" target switch. The reset switch normally is always active. Pressing that switch resets the game and returns the program and the reader to the first target on the first page. The reset function can also be provided by an on/off switch because turning the base unit 10 off and then on will reset the microprocessor.

An open book has a left-hand and a right-hand page. When the comic book 80 is attached to the base unit 10, only the right-hand page will overlay the membrane switch array 70. Consequently, only the right-hand pages are interactive. The left-hand pages are noninteractive and contain instructions to the reader and illustrate parts of the plot needed to tie together the action on the interactive pages.

Figure 4:
FIG. 4 shows one typical interactive page from a comic book.

The manner in which an interactive story operates is demonstrated by reference to FIG. 4, which shows the first interactive page of a typical interactive story. Of course, the actual commercial graphics are more detailed and in color. FIG. 4 shows the beginning of a science fiction story about "Evil Time Travelers" who intend to control all of history by stealing a secret power source. The cover of the book, as explained above, is also interactive and helps demonstrate the product. When a prospective customer presses the picture of one of the heroes on the cover, the unit will respond with a brief statement from that hero and an appropriate sound effect.

The reset target is in the upper left-hand corner of the cover. Pressing the reset announces the title of the story and produces several appropriate sound effects such as explosions. The cover also contains targets that allow the reader to select the level of difficulty: one through four. As the reader selects higher levels of difficulty, the various coordination and memory challenges within the story become more difficult. This allows the reader to interact with the same story many times, since the challenges of the interaction can be different each time.

The inside of the cover 81 (a left-hand page) is not interactive. It gives general directions for the interaction: how to press targets; how to use the various attack and target buttons (user switches 62); and how to interpret the LED display 64. It also gives some information about the characters in the story in case the reader is not already familiar with them. In the story illustrated here, the "Cosmic Master" 82 has gathered five heroes from various periods of history to help stop the Evil Time Travelers: a prehistoric caveman-type 83; a 1930s gangster 84; an Amazon warrior 85; a Cyborg 86 from the future; and a super warrior-type 87.

Figure 6:
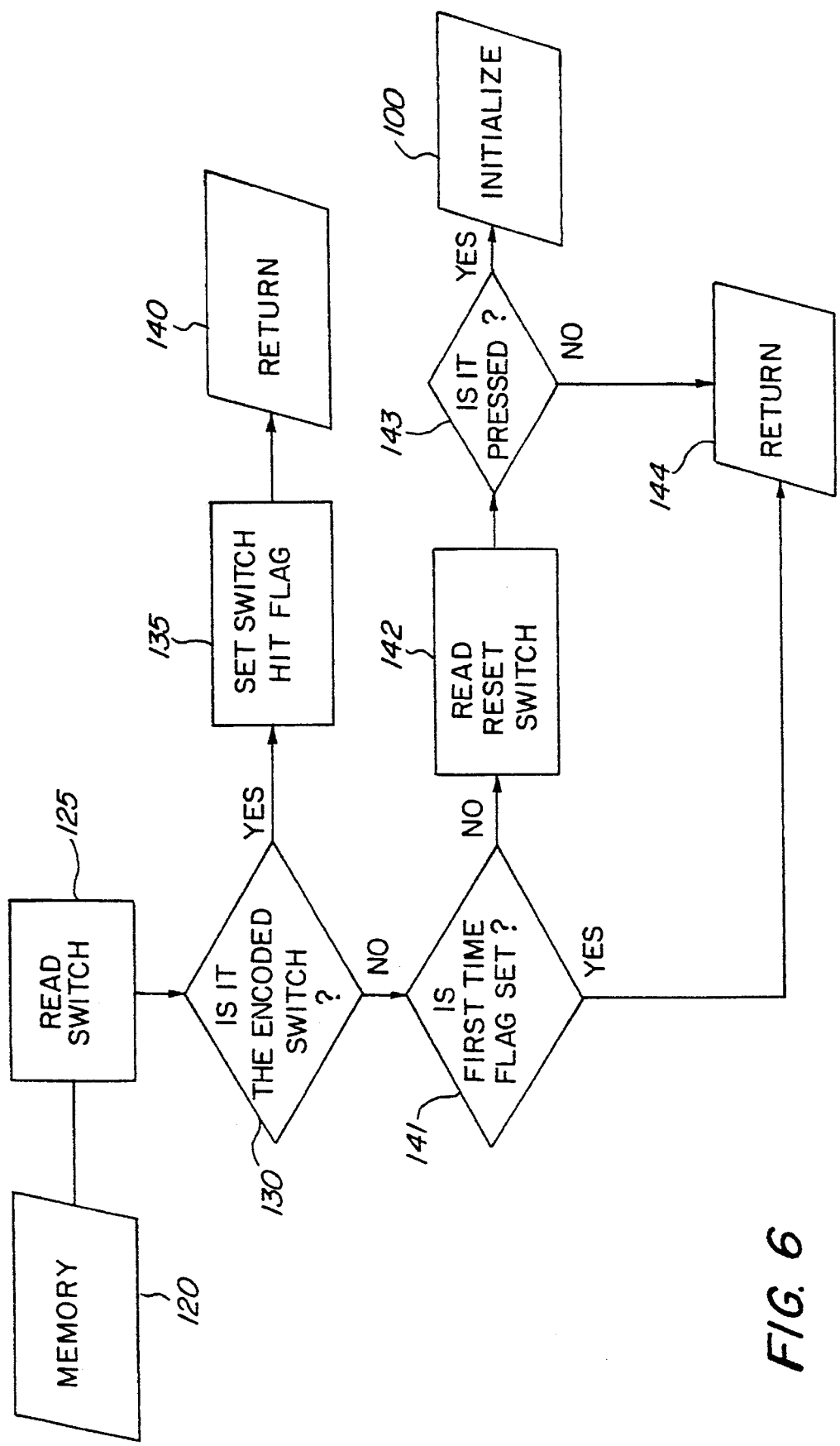
FIG. 6 is a flow chart showing the logic that controls the microprocessor's reading of the switches to determine whether a target has been pressed by the reader.

In the panel A of FIG. 6, the reader is invited to select a leader for the adventure. Each of the five heroes is marked with a target 89. By pressing one of the targets 89, the reader selects a champion for that interaction. This is a good example of multiple allowed targets and how they are used to add variety to the interaction. After the reset target is activated, the program is set to step one and all five of the hero targets become allowed. This means that the microprocessor will react to activation of any one of the five targets. Note that the only other allowed target is the reset which is continuously allowed (unless blocked by a special software sequence). All other targets will be ignored until after one of the five hero targets is selected. The reader selects a hero by pressing the appropriate target. When the microprocessor detects the activation, it performs the appropriate output. In this case the chosen hero makes a statement in his/her own voice. In this way the reader is able to alter the future direction of the interaction by making the choice of a mission leader.

Having detected an allowed activation and completed the tasks linked to that activation, the program advances to the next step. The identity of the chosen leader is stored in memory and the leader receives "special powers." In panel B, the Cosmic Master 82 makes a warning about the use of power. There are various challenges and combats later in the story. Each of these actions uses energy from the hero involved. The reader must keep track of the energy used as part of the strategy necessary to obtain a winning score.

Step two of the program introduces this power concept to the reader. In this step, the allowed targets are "Power Check" 90 (panel A) and the "Target Button" (one of the user switches 62 on edge of base unit 10). If the reader activates the Power Check target 90, then the five hero targets will become allowed. This is an example demonstrating sequential allowance of targets within a single program step. Activating a hero target will reveal the power level of that hero by lighting one of the LEDs 64 and beeping once for each of four power levels. Each hero starts off at level four (four LEDs and four beeps). The chosen leader has "special powers" and is at level eight (all four LEDs blink and there are eight beeps).

The program remains at step two until the Target Button is activated. This allows the reader to make multiple power checks before he/she goes on. When the reader presses the Target Button, the microprocessor makes the programmed output: the Master 82 speaks the time coordinates (panel C). The coordinates are represented by a sequence of four numbers which is randomly generated for each interaction. This is a challenge for the reader because the reader must remember this sequence and use it to "win" at the end of the interaction. Since the Power Check 90 and Target Button are both allowed at the same time, the reader can skip the entire Power Check Sequence by immediately pressing the Target Button.

The program moves on to step three and the "Time Portal" 91 (panel D) becomes the allowed target. A text note explains the procedure to the reader: "Press the Attack Button while the red light is on." When the Time Portal target 91 is activated, the LEDs 64 begin to blink in a random sequence. The red LED blinks on for a relatively short period of time. If the reader presses the Attack Button (one of the user switches 62) when the red LED is lit, the microprocessor produces an audio output: "You may pass." The program moves on to step four, which allows only the first target on the second interactive page. This forces the reader to turn the page in order to continue the interaction. The targets can never be activated in a random order; the unit never degenerates into a mere noise maker.

If the player presses the Attack Button at the wrong time, the microprocessor outputs: "ZZZAAAP ... AIIIEEE!!" This scream of pain signifies a failure by the reader. This is a good example of hand-eye coordination as a challenge during the interaction. Because the reader failed the challenge, his/her game score is lowered and the reader must try the challenge again to proceed.

The above description of the first page of the comic book 80 demonstrates several of the basic interactions between the reader and the story. The sequence of allowed targets is important for the proper functioning of the system. Generally only one target will be allowed at any give point in the interaction. After the allowed target has been activated, the system takes the appropriate action as determined by the program and moves to the next step where a different target becomes allowed. The sequence of allowed targets always moves forward through the book. Earlier pages and targets will be inactive.

Figure 5:
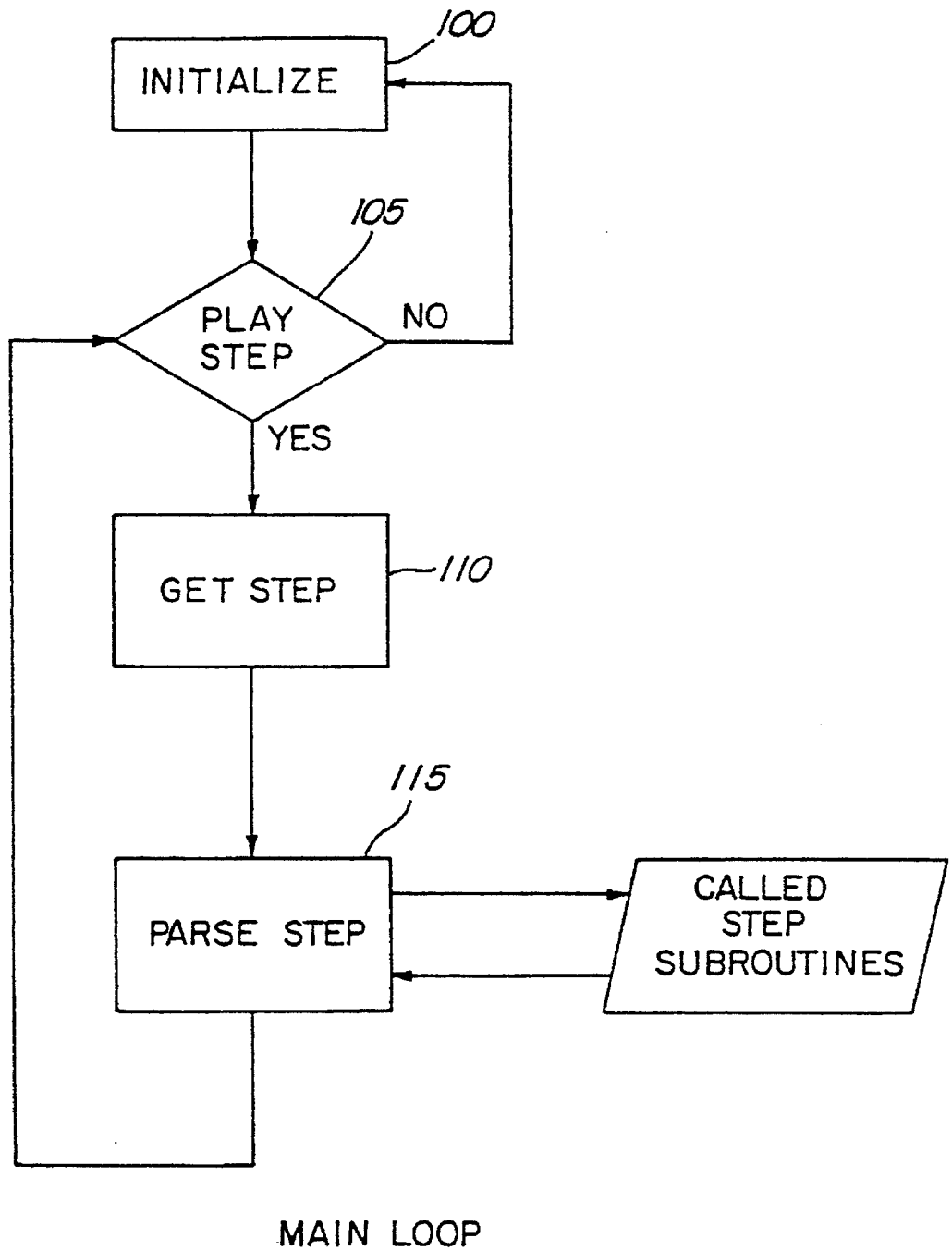
FIG. 5 is a flow chart showing the main loop of a program to create an interaction with a printed book.

FIG. 5 presents a flow chart showing the logical structure of a microprocessor program used to create the main structure of the interaction. The various phases of an interaction are termed "Steps." Essentially a Step refers to an allowed target or group of targets and the responses tied to the activation of those targets. After the responses are carried out, the program moves to the next Step and a new target(s) is (are) allowed. The Main Loop begins with an Initialize routine 100 that is invoked by pressing the reset target or by successful completion of an earlier game. After Initialize 100, the program enters a Play Step decision routine 105 that checks the step counter, a memory locations that points to a particular game step in the ROM. After initialization, the pointer will point to step zero. A different ROM location contains the total number of steps in a particular interaction so that a comparison between the pointer and the ROM location can be made at Play Step 105. If all the steps have not been played, the ROM pointer is incremented by one and the program passes to the Get Step routine 110. Each step of the interaction is represented by an array stored in the ROM. The Get Step routine 110 fetches the appropriate array (as defined by the pointer) and copies the array into RAM for decoding and additional processing.

The next routine Parse Step 115 examines the bytes of the array and translates the coded information into reader interaction. One byte of the array tells the routine whether the step is a "typical" step. In a typical step the first act is to output a sound. The array contains a pointer to the ROM location of the sound to be output. The next action is to determine which target switch(es) will be allowed during the step. The array encodes the number and the location of the allowed switch(es). The routine places the encoded switch position(s) into a memory location and calls a number of subroutines. FIG. 6 shows a key subroutine which determines which switches are allowed and whether the allowed switches have been activated.

Read Switch 125 decodes the encoded switch locations stored in memory 120 by Parse Cell 115 and reads the switch matrix 70. The switch matrix 70 is structured with switches 74 at the intersections of columns 75 and rows (not shown). To save time the Read Switch routine 125 checks only those columns 75 that have allowed switches 74 in that step. Decision box 130 determines whether one of the allowed switches has been activated, and if there had been an activation, routine 135 sets the switch hit flag memory location and stores the identity of the activated switch. Return routine 140 returns control to the calling routine. Decision boxes 141–144 are provided to deal with a situation where the allowed switch has not been activated. These boxes also permit software control of the reset target. A different subroutine (not shown) examines the switch hit flag and the identity of the activated switch and gives the response (often a sound) as specified in the Step Array. After all the Step Subroutines are complete, the program control returns to Parse Step 115 and the process repeats for the next step of the interaction.

Depending on the contents of the Step Array, a number of more complex interactions may transpire before a given step is completed. If more than one target switch is simultaneously allowed in a step, the reader is given a choice that will affect the outcome of the interaction. For example, in the comic book page explained above (FIG. 4), the reader is asked to choose the mission leader. In that step, the array allows each of the hero targets. The first one activated becomes the chosen leader. The switch hit routine 135 stores the chosen identity by increasing the power level of the chosen hero. This choice will have ramifications throughout the rest of the interaction.

There are many instances where the system introduces a random element to add variety to the interaction. In the comic book example the "time coordinates" were randomly synthesized so that each time the reader interacts with the story the results will be different. The time coordinates are a series of four numbers, each number ranging from one to four. That means that there are 256 different possible time coordinates. The possible values are recorded in the ROM to form a look-up-table. The microprocessor has a number of built in timers that are used to control various program functions. One of these timers is allowed to run continuously after the operation of the Initialize routine 100. Thus, the value of this timer changes constantly. When a random value, like the time coordinates, is called for by the program, the timer value is fetched and this value is used as an offset to retrieve a value from the appropriate look-up-table. Thus, one of the 256 possible combinations will be picked depending on the value of the timer. Because the timer changes constantly, the value chosen will be essentially random. This same approach is used to supply other "random" values required for the interaction.

The system can play a large number of challenging games with the reader. The possible variety is great, but most games rely on memory, hand-eye coordination, and logic. A "Combination Game" requires the reader to press a target sequence that the reader must deduce from various clues. This type of game action is used to open doors or safes and disarm bombs, etc. This activity can be scored by a race against the clock and by the percentage of successful outcomes.

A typical "Hand/Eye Coordination Game" requires the reader to watch the LED display for a specific pattern and/or listen for a certain sound and then press one of the user switches 62 at the correct time. This game is used to deflect incoming missiles, bombs or laser beams, etc. This type of challenge can be scored by a measurement of reaction time and number of successful tries.

A "Find the Hidden Object Game" uses hidden clues or other information from the story to discover the location of a hidden object. This tests the memory and deductive abilities of the reader. This type of game is used to discover secret doors or camouflaged assailants, etc. It can be scored by measuring the time needed for a success and the number of incorrect tries before the success.

"Battles" are a type of game activity that is a central feature of many interactive plots. In this type of game the reader selects a super hero based on the known skills and power level of that hero. The chosen hero is used to battle a particular enemy whose attributes make him liable to attack by the particular hero. Thus, the game combines logic and memory with speed and coordination during the battle. The Battle game combines aspects of all the other games mentioned above. It is used to resolve conflicts among characters. It can be scored by measuring the time necessary to win the battle and by comparing the damage done to the heroes with the damage done to the enemy.

Figure 7:
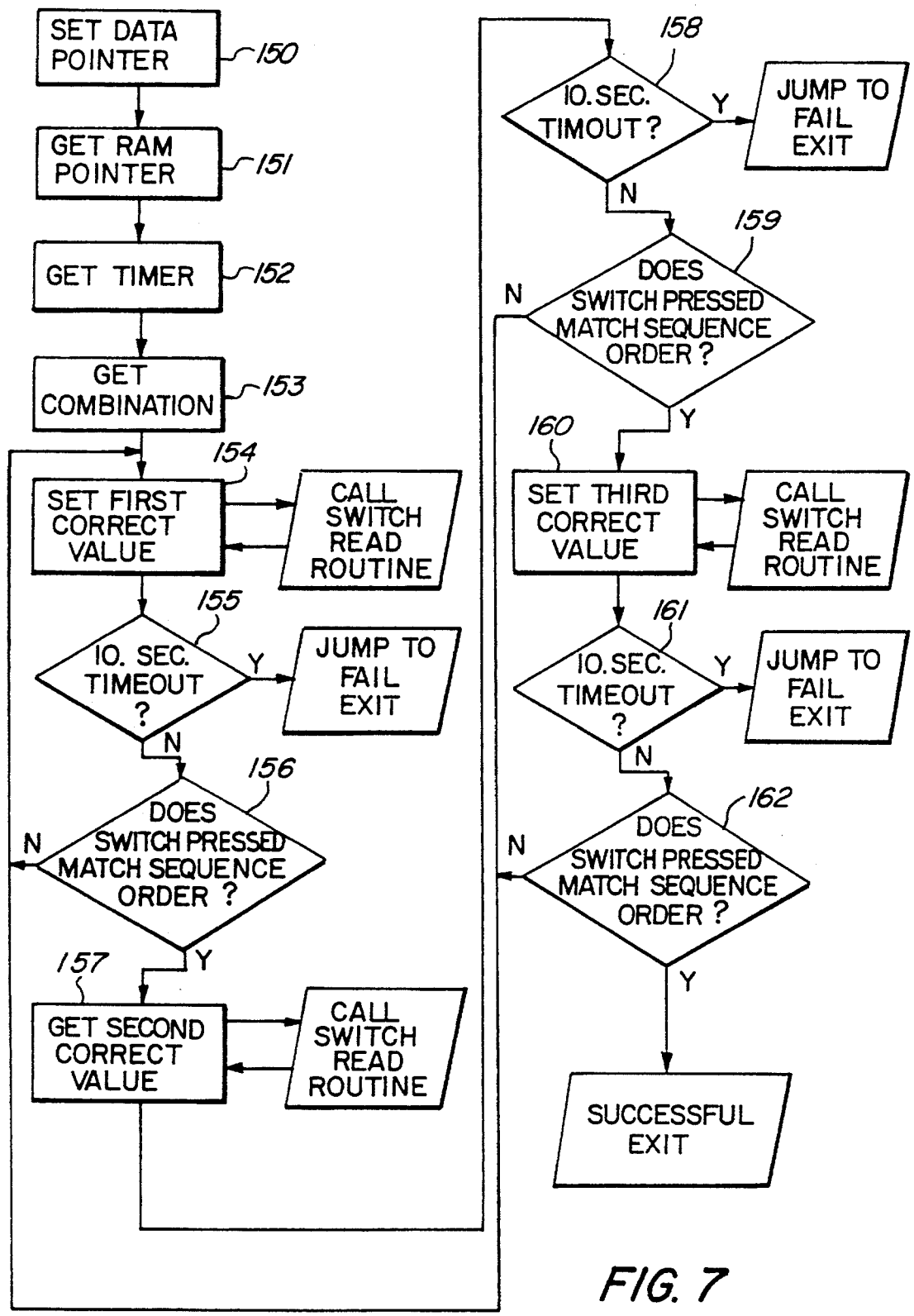
FIG. 7 is a flow chart showing the logic of a "enter the correct combination" game.

FIG. 7 shows a flow chart of a game challenge in which the reader must "enter the correct combination" to win. This Combination Lock game requires the reader to discover a three-digit combination and operates on a "random" principle like that used with the time coordinates as explained above. Routine 150 sets up a data pointer to the look-up table in ROM that contains all of the possible combinations. Routine 151 checks the ROM for the identity of the switches 74 that will be used by the reader to input the combination and stores these locations in RAM. For example, the book page might contain a drawing of a lock with numbered buttons. Routine 151 would obtain the identity of the switches 74 underlying the pictured buttons. The Routine 152 obtains the current value of the constantly running timer. As explained above, this timer value is used, in this case by routine 153, to select a possible combination from the look-up table. Routine 154 sets up the values (i.e. the locations of the possible switches 74) for the first digit of the combination and calls Switch Read, a routine that reads the allowed switches as set up by routine 154 and loops continuously reading those switches for ten seconds. When a switch is pressed or when the ten seconds elapses, control returns to the main Combination Lock program. Routine 155 tests whether the return was caused by a switch press or a time out. If return was caused by a time out, the reader fails the game and the program exits back to the Main Loop. If a switch was pressed, the program moves on to routine 156 which tests whether the correct switch for the first digit was pressed. If the wrong switch was pressed, the program starts over at routine 154. If the correct switch was pressed, the program moves on to routine 157 for the second digit. Routines 157, 158 and 159 replicate, for the second digit, the functions performed by routines 154, 155, and 156 for the first digit. Similarly, routines 160, 161, and 162 perform these functions for the third digit. When the third digit is successfully entered, the program makes a successful exit back to the Main Loop.

When the reader completes an interaction, the system gives the reader a score to show how well the reader has done. This is intended to challenge the reader to undertake the interaction repeatedly to improve his/her score and to compete with his/her friends. As explained above, the score is related to how rapidly the reader successfully completes the interaction. The timing and outcome of each of the many challenges impacts the player's score. Many game functions such as the Power Check feature are readily adaptable to scoring. In the case of the Power Check the more power the heroes have at the end, the higher the reader's score.

Figure 8:
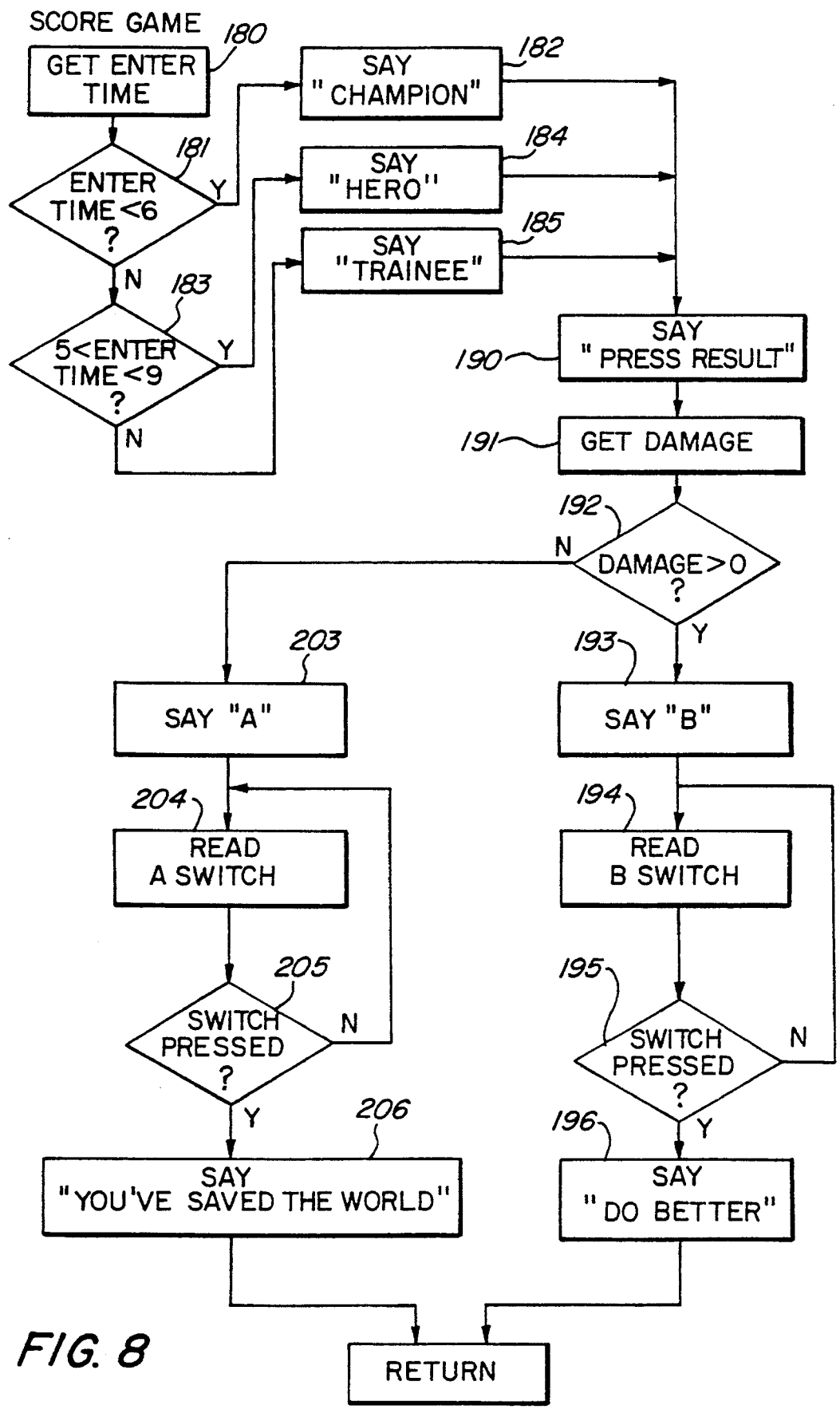
FIG. 8 is a flow chart showing how the reader's performance is used to create a score.

FIG. 8 shows a flow chart of a program, Score Game, to compute an overall score and present it to the reader. The score is based on how much time it took the reader to accomplish certain tasks and how much damage the reader's heroes sustained during combat during the interaction. The accumulated time for the various challenges is stored in a memory location called Enter Time. Routine 180 obtains the Enter Time value. Then routine 181 tests this value; if the accumulated value is less than 6, the program passes control to routine 182 which outputs the spoken word: "CHAMPION." If the accumulated time exceeds 6, routine 183 test for a value below 9. If the value is below 9, then routine 184 outputs the spoken word: "HERO." If the value exceeds 9, then routine 185 outputs the spoken word: "TRAINEE."

The next aspect of the score is based on the amount of harm sustained by the reader's heroes during the interaction. The amount of harm is stored in a memory location called "Damage." Routine 190 outputs the spoken phrase: "PRESS RESULT." Then routine 191 retrieves Damage, and routine 192 tests the magnitude of Damage. If there is any damage, the program moves on to routine 193 which outputs the spoken word: "B." This refers to a target and associated graphic. Routine 194 allows and reads switch 74 corresponding in position to target B. Routine 195 tests for the reader's activation of switch B. Routine 196 outputs the spoken phrase: "DO BETTER." If there is no damage, the program uses routine 203–206 which are similar to routine 193–196 except that the target involved is "A" and the final phrase is "YOU'VE SAVED THE WORLD." The exact format of the score can vary greatly from comic book to comic book. The notion is to produce a score that uses elements of the plot of the particular interaction.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An interactive system for allowing a reader to have interactions with a printed comic book, the interactions being determined according to a story depicted in the book and the interactions affecting an outcome of the story, the system comprising:

a base unit having a plurality of switches assembled in an array and means for providing audio output of varying frequencies from audio signals;

a comic book having a plurality of pages positioned to overlay the array of switches, at least some of the pages having indicia correspondingly arrayed to coordinate with specific switches of the array so that the reader can activate a specific switch by interacting with the corresponding indicium; and control means for determining a sequence of switches according to the story and responsive to an activation of the sequence of switches to enable a series of outputs associated with a specific switch, the outputs including audio signals for the audio output means to output.

2. The interactive system of claim 1, wherein the control means further requires a predetermined pattern of activations associated with the specific page before accepting activations associated with a subsequent page, the activations occurring in a predetermined sequence so that a subsequent switch in the sequence cannot be activated until an immediately prior switch in the sequence has been activated.

3. An interactive book system for allowing a reader to have interactions with a printed book, the interactions being determined according to a story depicted in the book and the interactions affecting an outcome of the story, the system comprising:

a base unit having a plurality of switches assembled in an array and means for providing audio output of varying frequencies from audio signals;

a book having a plurality of pages positioned to overlay the array of switches, at least some of the pages having indicia correspondingly arrayed to coordinate with specific switches of the array so that the reader can make a response to the story by activating a specific switch by interacting with the corresponding indicium; and control means for determining a sequence of switches according to the story and responsive to a specific sequence of activation of switches to enable a series of outputs associated with specific switches, the outputs including audio signals for the audio output means to output, the control means requiring the determined sequence of activations associated with the specific page before accepting activations associated with a subsequent page, the activations occurring in a predetermined sequence so that a subsequent switch in the sequence cannot be activated until an immediately prior switch in the sequence has been activated, and for determining the outcome of the story based upon the responses of the reader.

4. The interactive book system of claim 3, wherein the reader activates the switch by exerting pressure on the corresponding indicium.

5. The interactive book system of claim 3, wherein the reader activates the switch by applying magnetic force to the corresponding indicium.

6. The interactive book system of claim 3, wherein a change in temperature caused by the reader touching the corresponding indicium causes the activation of the switch.

7. The interactive book system of claim 3, wherein the switch is activated by a change in light reaching the switch, the change caused by the reader touching the corresponding indicium.

8. The interactive book system of claim 3, wherein the outputs of the control means further comprise audio signals for production of audio output.

9. The interactive book system of claim 3, wherein the base unit further comprises a plurality of light emitting diodes and the outputs of the control means further comprise devices to control the illumination of at least one of the light emitting diodes.

10. The interactive book system of claim 3, wherein the switches of the base unit further comprise buttons and switches not overlaid by the book and directly manipulable by the reader.

11. The interactive book system of claim 3, further comprising a clamping means for positioning the book with its plurality of pages so that the indicia of the pages remain correspondingly arrayed with specific switches despite repeated turning of the pages.

12. The interactive book system of claim 3, wherein the control means further comprises means for randomly determining the subsequent switch in the sequence so that the sequence varies each time the reader interacts with the book.

13. The interactive book system of claim 3, wherein the control means further comprises means for randomly assigning values so that the series of outputs varies each time the reader uses the system.

14. The interactive book system of claim 3, wherein the control means further comprises timer means for measuring a time period for completing the sequence of activations so that the time period can be compared to a predetermined time period for calculating a reader's performance score.

15. An interactive system for allowing a reader to have interactions with a story in a comic book, the interactions being determined according to a story depicted in the book and the interactions affecting an outcome of the story, the system comprising:

a base unit comprising:
- a plurality of pressure sensitive switches assembled in an array on an upper surface of the base unit;
- a plurality of switches on the base unit for direct activation by the reader;
- a plurality of light emitting diodes disposed on the base unit and;
- a speaker for providing audio output of varying frequencies from an audio signal;

a comic book having a plurality of pages, the comic book detachably connected to the base unit by clamping means and positioned to overlay the array of switches, at least some of the pages having indicia correspondingly arrayed to coordinate with specific switches of the array so that the reader can make a response to the story by activating a specific switch by exerting pressure on the corresponding indicium; and a microprocessor with a built-in program and data, the microprocessor and its program comprising:
- a routine for sequentially executing the built-in program step by step;
- a routine for detecting when one of the switches on the base unit has been activated;
- a routine for determining a location of the activated switch; a routine for comparing the location to the program to determine whether a specified switch, for that step, has been activated;
- a routine for performing an output as determined in the program step if the specified switch has been activated, the output including providing an audio signal to the speaker;
- a routine for advancing to the next program step when the specified switch has been activated so that the sequence of specified switches forces the reader to progress forward through the comic book; and
- a routine for introducing random variations at predetermined places in the story so as to alter the outcome of the story.

16. The interactive system of claim 15, wherein the base unit further comprises a socket for inserting a game cartridge.

17. The interactive system of claim 16, wherein the microprocessor is located in the game cartridge.

18. The interactive system of claim 15, wherein at a predetermined step the microprocessor randomly chooses one of a group of several predetermined switches so that one of the predetermined switches becomes the specified switch for that step whereby the overall sequence of specified switches varies each time the reader interacts with the book.

19. The interactive system of claim 15, wherein at a predetermined step the microprocessor accepts any one of a group of predetermined switches as the specified switch for that step and wherein the reader makes a choice from the group of predetermined switches and the microprocessor then determines the specified switch for a subsequent step in response to the switch chosen by the reader.

20. The interactive system of claim 15, wherein the output performed in response to the activation of the specified switch is the illumination of at least one of the light emitting diodes.

21. The interactive system of claim 15, wherein the output performed in response to the activation of the specified switch is the production of audio signals by the microprocessor, the signals representing sound effects and spoken words that correlate with the story.

22. The interactive system of claim 15, wherein the microprocessor measures a period of time taken by the reader to activate a sequence of specified switches, the period of time being then compared to a predetermined period of time to calculate a performance score for the reader.

23. A method of providing interactive responses between a reader and a story presented in printed materials for maintaining proper synchronization between the responses so that the reader progresses in a predetermined direction through the materials, and for allowing the reader to alter an outcome of the story, the method comprising the steps of:

providing a surface divided into a plurality of locations and capable of producing signals which can be used for detecting physical interaction with said surface and for detecting at which location on said surface the physical interaction occurs;

specifying which locations will produce a response upon physical interaction with said locations and specifying what the response will comprise;

overlaying a first printed page of a book on the surface, the page presenting a Story and having at least one region delineated to accept reader interaction;

using the surface to detect when and at what location the reader interacts with the first page; and producing a predetermined response to the interaction, said response including specifying which subsequent location will produce a response upon physical interaction with said location so that the reader must move in one direction through the pages of the book and so that the reader's response will affect the outcome of the story.

24. The method of claim 23, wherein the physical interaction is the application of pressure to a location on the printed page.

25. The method of claim 23, wherein the physical interaction is the application of magnetic force to a location on the printed page.

26. The method of claim 23, wherein the physical interaction is the application of heat to a location on the printed page.

27. The method of claim 23, wherein the physical interaction is the application of light to a location on the printed page.

28. The method of claim 23, wherein the response further includes the production of sound.

29. The method of claim 23, wherein the response further includes the production of light.

* * * * *